United States Patent
Gokcen et al.

[19]

[11] Patent Number: 5,912,026

[45] Date of Patent: Jun. 15, 1999

[54] DEVICE FOR PROVIDING A HINGE TO EXTRUDED PLASTIC

[75] Inventors: Cem M. Gokcen; Keith Hoschouer, both of Greenville, Ohio

[73] Assignee: Preferred Plastic Sheet Company, Greenville, Ohio

[21] Appl. No.: 08/918,011

[22] Filed: Aug. 25, 1997

[51] Int. Cl.⁶ ..................................................... B29C 59/04
[52] U.S. Cl. ...................... 425/327; 264/210.1; 264/284; 264/294; 425/335; 425/363; 425/385
[58] Field of Search ..................... 425/363, 385, 425/396, 369, 335, 336, 327; 249/52; 264/162, 210.1, 284, 293, 294

[56] References Cited

U.S. PATENT DOCUMENTS

| | | |
|---|---|---|
| 683,863 | 10/1901 | Semmer . |
| 3,320,225 | 5/1967 | Bradbury . |
| 3,704,975 | 12/1972 | Bunting, Jr. et al. . |
| 3,917,772 | 11/1975 | Hollenbeck . |
| 4,079,114 | 3/1978 | Bonner . |
| 4,080,878 | 3/1978 | Gallagher et al. ..................... 425/363 |
| 4,528,148 | 7/1985 | Potti ....................................... 425/385 |
| 4,921,563 | 5/1990 | Schwertner et al. . |
| 4,938,677 | 7/1990 | Robbins, III ........................... 425/363 |
| 5,169,651 | 12/1992 | Heiber et al. . |
| 5,552,101 | 9/1996 | Fujii et al. .............................. 425/363 |

*Primary Examiner*—James P. Mackey
*Attorney, Agent, or Firm*—St. Onge Steward Johnston & Reens LLC

[57] ABSTRACT

Disclosed is a device for forming a hinge in a sheet of extruded plastic. Plastic material is extruded and passed between a pair of rolls to determine the thickness of the plastic sheet. A groove forming member of a scoring assembly then creates a groove in the sheet of plastic when the plastic is still warm. The groove forming process creates a plastic ridge on both sides of the groove. To flatten these ridges, the sheet then passes through a second set of rolls. The sheet of plastic, still warm, is then cooled by a conventional method. The scoring assembly is movable along the width of the sheet of plastic and is adjustable for the depth of groove. The scoring assembly can also be removable. Once a groove is created, the groove acts as a hinge and the sheet can be bent or folded along the grooved edge.

8 Claims, 2 Drawing Sheets

DEVICE FOR PROVIDING A HINGE TO EXTRUDED PLASTIC

FIELD OF THE INVENTION

The invention relates to method and apparatus for providing a hinge to extruded plastic, and more specifically, the invention relates to method and apparatus for providing a groove to extruded plastic, where the groove is formed without introducing excessive stress to the plastic and where location, size and shape of the groove on the extruded plastic can be modified expeditiously and economically.

BACKGROUND OF THE INVENTION

Much effort has been expended to provide a hinge to extruded plastic. This is because there are important commercial benefits in providing such a hinge. First, if a sheet of extruded plastic can be bent or folded, this makes the plastic sheet much easier to handle, store and transport. This is especially the case where the sheet of plastic is large. And second, a sheet of extruded plastic that can be bent or folded has commercial applications, such as a box or a container.

For example, U.S. Pat. No. 4,921,563 ("the '563 patent") discloses a method for making foldable plastic products. The '563 patent discloses an extruding apparatus having three rollers defining two nips, where the first nip is used to form a sheet of plastic material having a predetermined thickness and the second nip is used to cool the sheet of plastic material. Only after the sheet of plastic material has cooled and solidified, is a stationary cutting tool employed to provide an L-shaped slit in the sheet which serves as a hinge for the plastic sheet.

There are disadvantages associated with the extruding apparatus of the '563 patent. First, because the sheet of plastic material must be properly cooled and solidified prior to the cutting procedure, there is an associated delay in the manufacturing process. And second, it has been found that cutting a cooled and solidified plastic sheet may tend to cause cracks or fractures in the plastic where such a cut is made. Introduction of cracks or fractures in a sheet of plastic is undesirable because of the significant detrimental effect on the integrity of the plastic sheet.

U.S. Pat. No. 5,169,651 ("the '651 patent") discloses a scoring apparatus for forming a fold line for boxboard window material, such as PVC film. The '651 patent does not disclose an extruder. The scoring apparatus has a series of heated creasing rollers which, as a film of plastic is drawn through the apparatus, provide a groove of successively increasing depth to the plastic film. Downstream of the creasing rollers is a heated caliper roller which flattens shoulders surrounding the groove formed by the creasing rollers. The caliper roller also penetrates the groove to a depth less than that of the last creasing roller to finally form the groove in the plastic film.

There are disadvantages associated with the scoring apparatus of the '651 patent. First, since the apparatus does not disclose an extruder, the film must be reheated before it can be scored. Second, although the heated creasing rollers and the heated caliper roller may be adjusted vertically to alter the depth of a groove, there is no means provided to modify the location of a groove with respect to the plastic film. Thus, with the scoring apparatus of the '651 patent, there is no expeditious way to provide fold lines at different locations on successive batches of plastic sheets. And third, the scoring apparatus of the '651 patent does not provide expeditious adjustment of the size and shape of a groove to be formed on the plastic film. In order to modify the size and shape of the groove, all of the heated creasing rollers and the heated caliper roller must be replaced, which would entail significant costs and time delay.

Another prior art method for providing a hinge to a sheet of plastic is disclosed in U.S. Pat. No. 3,320,225 ("the '225 patent"). The '225 patent discloses an extrusion apparatus having two pressure rolls defining a nip. At least one of the rolls has formed integrally thereon a ridge for providing a groove to a sheet of plastic.

The apparatus of the '225 patent has disadvantages similar to those associated with the scoring apparatus of the '651 patent. First, there is no means provided to modify the location of the groove with respect to the sheet of plastic. Thus, there is no expeditious way to provide hinges at different locations on successive batches of plastic sheets. And second, the apparatus of the '225 patent does not provide expeditious adjustment of the size and shape of a groove to be formed on the sheet of plastic. In order to modify the size and shape of the groove, it is required that the pressure roll or rolls with the ridge formed integrally thereon be replaced, thereby entailing significant costs and time delay.

Prior attempts to provide a hinge to extruded plastic have been problematic for the disadvantages discussed above. What is desired, therefore, is a method and apparatus for providing a hinge to extruded plastic, while it is still warm and wherein the location, size and shape of the hinge can be readily modified in an expeditious and economical manner.

SUMMARY OF THE INVENTION

Accordingly, it is an object of the invention to provide a method and apparatus for providing a hinge to extruded plastic while it is still warm.

Another object of the invention is to provide a method and apparatus of the above character where the hinge is provided without manufacturing delay.

Still another object of the invention is to provide a method and apparatus of the above character which permits modification of the location, size and shape of the hinge in an expeditious and economical manner.

These and other objects of the invention are achieved by an apparatus for providing a hinge to a sheet of extruded plastic, comprising an extruder for extruding plastic material in a semi-molten state, a first nip for adjusting a thickness of the sheet, a second nip for cooling the sheet, and a scoring assembly, inserted between the first and second nips for forming a groove in the sheet. First and second rolls define the first nip. A second set of rolls defines the second nip. The second nip may be formed between a third roll and one of the rolls forming the first nip, or may be formed between third and fourth rolls.

The scoring assembly includes a groove forming member which creates a third nip, between the first and second nip. The groove forming member has a lateral width that is substantially less than the lateral width of the roll that forms the third nip with the groove forming member. Semi-molten plastic is extruded from a die and passes through the first nip which determines the thickness of the plastic sheet. The plastic sheet then meets the scoring assembly which creates a groove on the sheet. The scoring assembly is adjustable both in the depth of its groove and along the width of the plastic sheet. This allows the groove in the plastic sheet to be easily varied in depth and in location along the width of the plastic sheet.

During the formation of the groove, the scoring assembly creates a ridge of plastic on each side of the groove. These ridges are flattened as the sheet passes through the second nip because at this stage, the plastic is still warm. The second nip is adjusted to a depth to compress the ridges to an acceptable level. Because the plastic sheet is still warm, cooling of the sheet is required to solidify the plastic sheet after formation of the groove and flattening of the ridges. The hinged plastic sheet is then ready for further manufacturing.

The groove forming member of the scoring assembly can be readily removed from the scoring assembly and replaced to create different shapes and sizes of grooves. This is much more convenient than in prior art systems which disadvantageously require removal and replacement of multiple groove forming members, or entire rolls to adjust the hinge. The invention permits a manufacturer to produce short runs of hinged, extruded plastic sheet in an economical manner.

The invention and its particular features and advantages will become more apparent from the following detailed description considered with reference to the accompanying drawings.

DETAILED DESCRIPTION OF THE INVENTION

Figure 1:
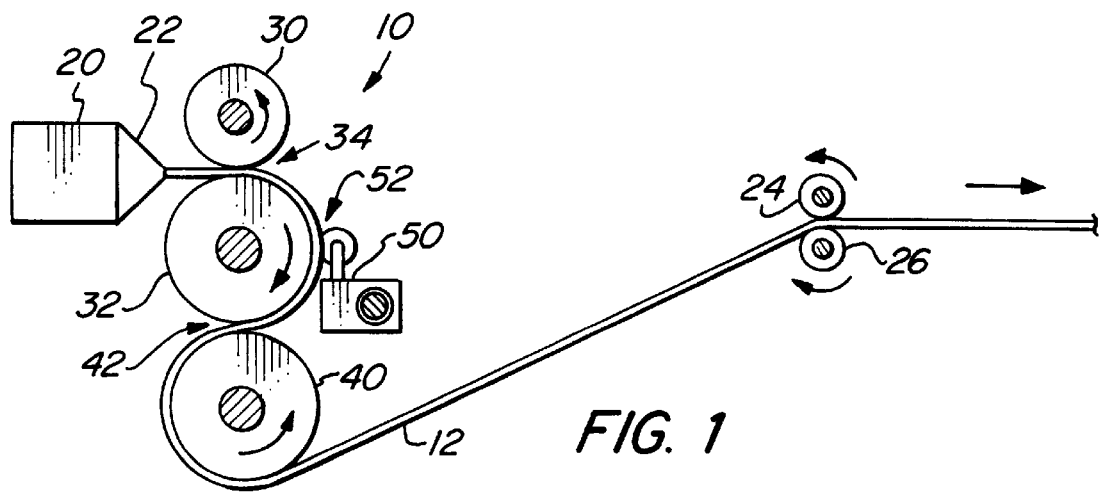
FIG. 1 is a schematic illustration of an apparatus of the present invention for providing a hinge to a sheet of extruded plastic.

FIG. 1 shows an apparatus 10 of the invention for providing a hinge to a sheet of extruded plastic 12. The apparatus 10 includes a conventional extruder 20, a die 22 in fluid communication with the extruder 20, and advancing rollers 24, 26 which draw the sheet of extruded plastic 12 forward through the apparatus 10 by employing a frictional surface. Driving the advancing rollers 24, 26 is a conventional drive source (not shown). The apparatus 10 further includes a first roll 30 and a second roll 32, between which is defined a first nip 34. The first and second rolls 30, 32 are positioned adjacent the die 22 so that plastic material forced through the die 22 passes through the first nip 34 to form the sheet of extruded plastic 12 having a predetermined thickness. It should be apparent that the thickness of the sheet of extruded plastic 12 can be modified by adjusting the first and second rolls 30, 32 to define the first nip 34 accordingly.

A third roll 40 is positioned proximate the second roll 32 so that the space between the second and third rolls 32, 40 forms a second nip 42. The second nip 42 is positioned downstream from the first nip 34. As used herein, the terms "downstream" and "upstream" refer to positioning relative to the movement of the sheet of extruded plastic 12 through the apparatus 10. Positioned proximate the second roll 32 is a movable scoring assembly 50. The second roll 32 and the scoring assembly 50 define a third nip 52. The third nip 52 is positioned downstream from the first nip 34, but upstream from the second nip 42.

Figure 2:
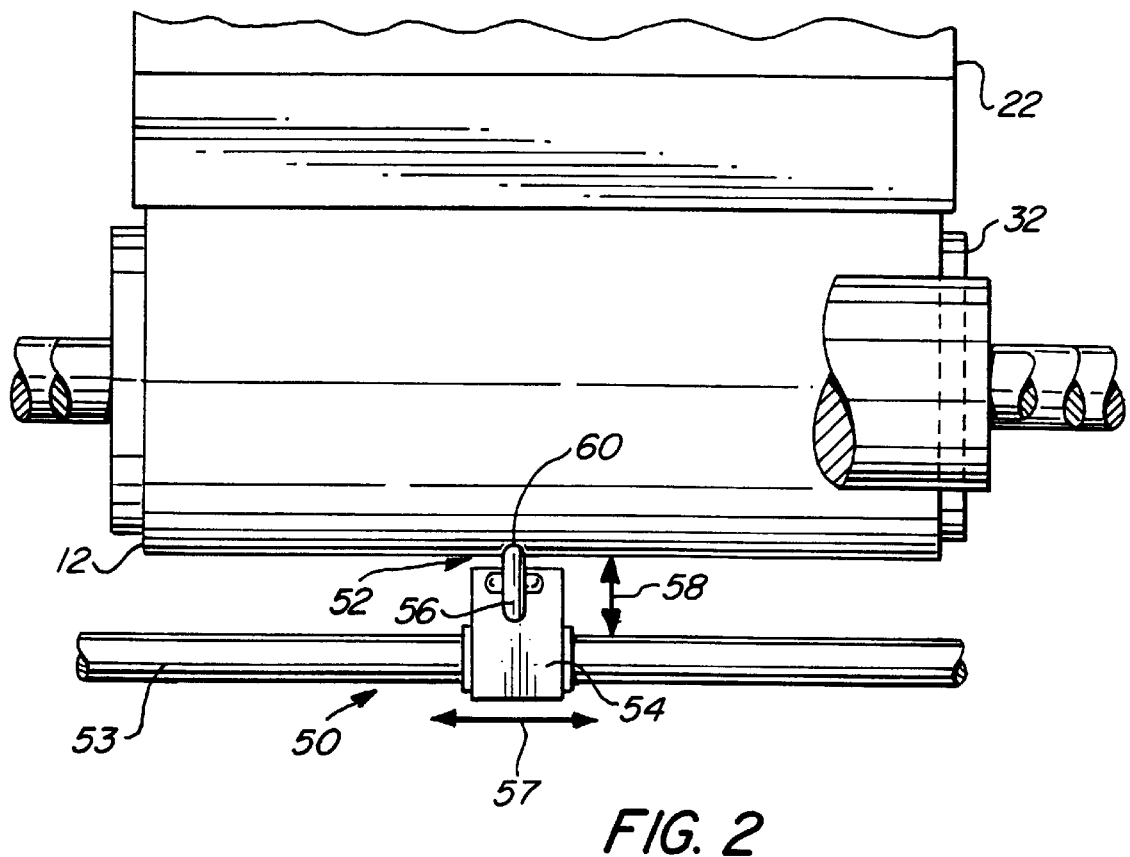
FIG. 2 is a partial top plan view with the first roll removed for clarity of the apparatus of FIG. 1, showing the movable scoring assembly and the nip formed between the scoring assembly and the second roll.

The movable scoring assembly 50 will be discussed with reference to FIG. 2. The scoring assembly 50 includes a housing 54 which is preferably, slidably mounted on a rod 53 of the apparatus 10 which is substantially parallel to the width of the sheet of extruded plastic 12. A groove forming member 56, which is preferably a rotatable wheel, is adjustably and removably attached to the housing 54 to provide a groove 60 (better illustrated in FIG. 3a) to the sheet of extruded plastic 12 passing through the third nip 52. The groove forming member 56 is adjustable as indicated by arrow 58 to provide grooves 60 of different depth in the sheet of extruded plastic 12. The movability of the scoring assembly 50 along the width of the sheet 12, indicated by arrow 57, permits the apparatus 10 of the present invention to expeditiously and economically change the location of the groove 60 with respect to the sheet of extruded plastic 12.

Furthermore, as will be described hereinbelow, the removability of the groove forming member 56 means that grooves of different size and shape can be provided to the sheet of extruded plastic 12 quickly, easily and economically by simply changing the groove forming member 56. Note that the scoring assembly 50 is provided with a conventional stopper means (not shown) for locking the scoring assembly 50 in a position along the rod 53 once the desired location of the groove 60 on the sheet 12 is determined.

Figure 3A:
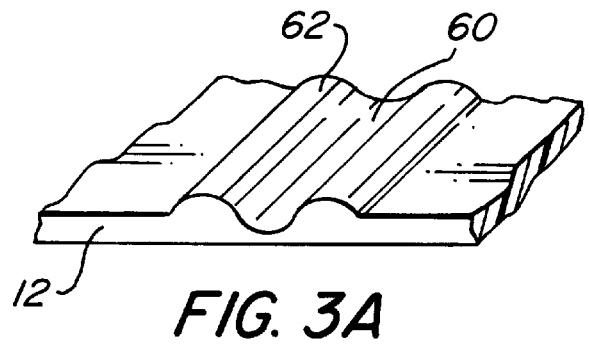
FIG. 3a is a partial perspective of a sheet of extruded plastic having a groove with ridges adjacent thereto formed by the movable scoring assembly of the apparatus of FIG. 1.
Figure 3B:
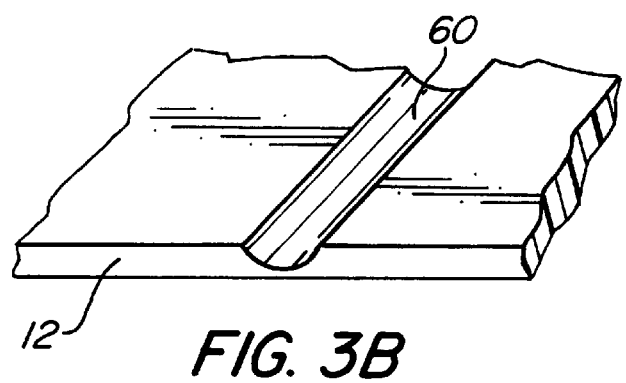
FIG. 3b is a partial perspective of the sheet of extruded plastic of FIG. 3a with the ridges flattened by the second nip region of the apparatus of FIG. 1.

The operation of the apparatus 10 of the present invention will be described with respect to FIGS. 3a–3c. Note that before plastic material is fed into the extruder 20, the first, second and third nips 34, 42, 52 must be properly defined as discussed above to form the sheet of extruded plastic 12 having the desired thickness. Also, a groove forming member 56 configured to provide the desired size and shape groove 60 must be adjustably attached to the housing 54 of the movable scoring assembly 50. Furthermore, the scoring assembly 50 must be positioned to provide the desired location of the groove 60 on the sheet of extruded plastic 12.

When the plastic material is fed into the extruder 20 and forced through the die 22, it is in the form of a hot, soft strip. This strip passes through the first nip 34 to form the sheet of extruded plastic 12 having the predetermined thickness. The sheet 12 is then moved downstream by the advancing rollers 24, 26 and is passed through the third nip 52, where it is provided with the groove 60. Since the sheet of extruded plastic 12 is still warm and soft at the third nip 52, the formation of the groove 60 causes ridges 62 to be formed adjacent the groove 60. This is shown in FIG. 3a.

It should be noted that because the sheet 12 is semi-molten when the groove 60 is provided, the formation of the groove 60 does not introduce cracks or fractures in the sheet 12.

The sheet 12 continues to be moved downstream by the advancing rollers 24, 26 until it is passed through the second nip 42. It is preferred that at least the third roll 40 be chilled in a conventional manner, such as water cooling, so that the sheet 12 passing through the second nip 42 is hardened or solidified. Also, as the sheet 12 passes through the second nip 42, the ridges 62 adjacent the groove 60 are flattened as illustrated in FIG. 3b. Therefore, emerging from the second nip 42 is a hardened sheet of plastic 12 which is ready for further processing downstream, such as additional cooling and/or cutting into segments.

Figure 3C:
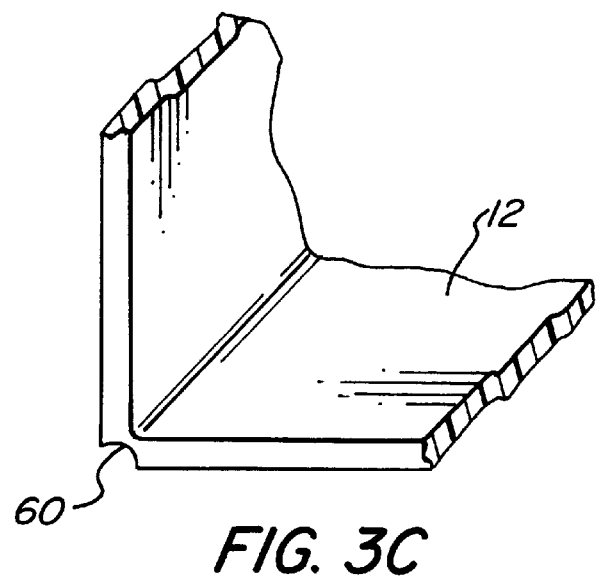
FIG. 3c is a partial perspective of the sheet of extruded plastic of FIG. 3b bent along the groove which serves as a hinge.

FIG. 3c shows the groove 60 in the plastic segment serving as a hinge. The hinge makes the plastic segment much easier to handle, store and transport. Also, the hinge can make the plastic segment useful for commercial applications.

If the location of the groove 60 on the sheet of extruded plastic 12 is desired to be changed, the apparatus 10 of the present invention simply requires that the scoring assembly 50 be moved to the position desired. Furthermore, if the shape and size of the groove 60 is desired to be changed, the apparatus 10 of the present invention simply requires that the groove forming member 56 be replaced accordingly.

It should be apparent to one skilled in the art that the scoring assembly 50, rather than the groove forming member 56, can be adjustable to provide grooves of different depth in the sheet of extruded plastic 12. Also, it should be apparent to one skilled in the art that the scoring assembly 50 can be made movable along a width of the sheet 12 by means other than the use of the rod 53. For example, the scoring assembly could be connectable at fixed intervals on a rigid structure or surface along the width of the sheet. This rigid structure could be a floor or a ceiling.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An apparatus for providing a hinge to a sheet of plastic material, which comprises:

an extruder for producing a sheet of plastic material;

a first nip positioned adjacent said extruder, said first nip providing the sheet of plastic material with a predetermined thickness;

a second nip positioned downstream from said first nip for cooling the sheet of plastic material; and a scoring assembly positioned between said first and second nips, said scoring assembly for providing a groove in the sheet of plastic material; and said second nip sized to flatten ridges formed adjacent the groove as a result of groove formation by said scoring assembly.

2. The apparatus of claim 1, wherein said first nip comprises a first roll and a second roll.

3. The apparatus of claim 2, wherein said scoring assembly includes a groove forming member defining a third nip with the second roll, said third nip located upstream of said second nip.

4. The apparatus of claim 3, wherein said groove forming member has a lateral width which is substantially less than a lateral width of said second roll.

5. The apparatus of claim 3, wherein the groove forming member is a wheel.

6. The apparatus of claim 4, wherein the groove forming member is a wheel.

7. An apparatus for providing a hinge to a sheet of plastic material, which comprises:

an extruder for producing a sheet of plastic material;

a first nip positioned adjacent said extruder, said first nip providing the sheet of plastic material with a predetermined thickness;

a second nip positioned downstream from said first nip for cooling the sheet of plastic material; and a scoring assembly positioned between said first and second nips, said scoring assembly including a groove forming member for providing a groove in the sheet of plastic material, said groove forming member defining a third nip, said third nip located between said first and second nips; and said second nip sized to flatten ridges formed adjacent the groove as a result of groove formation by said scoring assembly.

8. The apparatus of claim 7, wherein the groove forming member is a wheel.

* * * * *